US012775968B2

(12) United States Patent
Umeda et al.

(10) Patent No.: US 12,775,968 B2
(45) Date of Patent: Oct. 27, 2026

(54) MULTI-TENANT SYSTEM, SERVICE PROVISION METHOD, AND INFORMATION STORAGE MEDIUM

(71) Applicant: Cybozu, Inc., Tokyo (JP)

(72) Inventors: Taiga Umeda, Tokyo (JP); Taro Onodera, Tokorozawa (JP)

(73) Assignee: CYBOZU, INC., Tokyo (JP)

( * ) Notice: Subject to any disclaimer, the term of this patent is extended or adjusted under 35 U.S.C. 154(b) by 307 days.

(21) Appl. No.: 18/476,288

(22) Filed: Sep. 27, 2023

(65) Prior Publication Data

US 2024/0112233 A1 Apr. 4, 2024

(30) Foreign Application Priority Data

Sep. 29, 2022 (JP) ................................ 2022-156151

(51) Int. Cl.
*G06Q 30/0601* (2023.01)
*G06F 9/54* (2006.01)

(52) U.S. Cl.
CPC ......... *G06Q 30/0621* (2013.01); *G06F 9/547* (2013.01); *G06Q 30/0609* (2013.01)

(58) Field of Classification Search
CPC ..... G06Q 50/10; G06Q 30/0621; G06F 9/547
See application file for complete search history.

(56) References Cited

U.S. PATENT DOCUMENTS 9,712,410 B1 * 7/2017 Char ........................ H04L 43/08
9,791,993 B2 * 10/2017 Waite ........................ G06F 8/36
10,558,685 B2 * 2/2020 Kuruganti ............. G06F 16/273
11,315,041 B1 * 4/2022 Jain ......................... G06N 20/20
12,298,959 B2 * 5/2025 Vasilevskiy ......... G06F 16/2291
2012/0173581 A1 * 7/2012 Hartig ................. G06F 11/0745 707/E17.001
2012/0321070 A1 * 12/2012 Smith ................. H04M 3/5231 379/265.09
2013/0239029 A1 * 9/2013 Waite ...................... G06F 17/00 715/762
2015/0058471 A1 * 2/2015 McPherson ............. H04L 41/40 709/224
2015/0319192 A1 * 11/2015 Cabrera .................. H04L 63/10 726/1
2016/0156671 A1 * 6/2016 Cabrera .................. H04L 63/20 726/1
2016/0189129 A1 * 6/2016 Yang .................. G06Q 20/3829 705/39

(Continued)

OTHER PUBLICATIONS

Wada, "Considering Multi-Tenancy and OEM (white label) for SaaS Services," published on Jun. 23, 2022, retrieved on Sep. 16, 2022, Internet, URL: https://techblog.optim.co.jp/entry/2022/06/23/100000, pp. 1-13.

*Primary Examiner* — Oluseye Iwarere
(74) *Attorney, Agent, or Firm* — HEA Law PLLC

(57) ABSTRACT

Provided is a multi-tenant system including at least one processor configured to: acquire, from a contract partner system of a contract partner contracted with a vendor of a multi-tenant service, customization information relating to customization specific to the contract partner; execute the customization based on the customization information; and provide a customized service, which is the service on which the customization has been executed, to a user who has performed a predetermined usage application.

11 Claims, 8 Drawing Sheets

(56) References Cited

U.S. PATENT DOCUMENTS

| | | | | |
|---|---|---|---|---|
| 2016/0217050 | A1* | 7/2016 | Grimm | G06F 11/203 |
| 2017/0235936 | A1* | 8/2017 | de los Rios | G06F 21/36<br>726/19 |
| 2018/0159856 | A1* | 6/2018 | Gujarathi | H04L 63/0281 |
| 2019/0098055 | A1* | 3/2019 | Pitre | H04L 63/20 |
| 2019/0098056 | A1* | 3/2019 | Pitre | G06F 21/6218 |
| 2019/0158666 | A1* | 5/2019 | St-Cyr | G06N 20/00 |
| 2020/0043064 | A1* | 2/2020 | Wang | G06F 3/0482 |
| 2020/0379829 | A1* | 12/2020 | Vasilevskiy | G06F 16/27 |
| 2020/0379970 | A1* | 12/2020 | Vasilevskiy | G06F 16/2291 |
| 2020/0379973 | A1* | 12/2020 | Liu | H04L 51/224 |
| 2020/0412738 | A1* | 12/2020 | Hirokawa | H04L 63/08 |
| 2022/0021766 | A1* | 1/2022 | St-Cyr | G06F 16/9035 |
| 2022/0245146 | A1* | 8/2022 | Mimms | G06F 16/24532 |
| 2024/0112233 | A1* | 4/2024 | Umeda | G06Q 50/10 |
| 2024/0205305 | A1* | 6/2024 | Fu | H04L 43/16 |
| 2024/0296434 | A1* | 9/2024 | Chiu | G06Q 20/102 |

* cited by examiner

FIG. 7

DB

| CONTRACT PARTNER | SUBDOMAIN | LAYOUT INFORMATION | SPACE INFORMATION | APP INFORMATION | THREAD INFORMATION |
|---|---|---|---|---|---|
| DDD CORPORATION | dddbbbwork.aaawork.com | LAYOUT INFORMATION1 | SPACE INFORMATION1 | APP INFORMATION1 | THREAD INFORMATION1 |
| EEE CORPORATION | eeebbbwork.aaawork.com | LAYOUT INFORMATION2 | SPACE INFORMATION2 | APP INFORMATION2 | THREAD INFORMATION2 |
| FFF CORPORATION | fffbbbwork.aaawork.com | LAYOUT INFORMATION3 | SPACE INFORMATION3 | APP INFORMATION3 | THREAD INFORMATION3 |
| . . . | . . . | . . . | . . . | . . . | . . . |

MULTI-TENANT SYSTEM, SERVICE PROVISION METHOD, AND INFORMATION STORAGE MEDIUM

CROSS-REFERENCE TO RELATED APPLICATION

The present disclosure contains subject matter related to that disclosed in Japanese Patent Application JP 2022-156151 filed in the Japan Patent Office on Sep. 29, 2022 the entire contents of which are hereby incorporated by reference.

BACKGROUND OF THE INVENTION

1. Field of the Invention

The embodiments disclosed herein relate to a multi-tenant system, a service provision method, and an information storage medium.

2. Description of the Related Art

Hitherto, there has been known a technology called multi-tenancy for providing a service to a plurality of users in a common environment. For example, in "Considering Multi-Tenancy and OEM (white label) for SaaS Services," Internet, retrieved on Sep. 16, 2022, online, https://tech-blog.optim.co.jp/entry/2022/06/23/100000, multi-tenancy for providing a service in a common environment to users who have received a usage license directly from a vendor and users who have received a usage license from each of a plurality of contract partners contracted with the vendor is described. In the technology as described in "Considering Multi-Tenancy and OEM (white label) for SaaS Services," the system on the vendor side manages setting differences prepared for each contract partner, and dynamically switches the setting differences in accordance with the user who has accessed the system.

However, in the technology as described in "Considering Multi-Tenancy and OEM (white label) for SaaS Services," in order for the system on the vendor side to manage the setting differences, the vendor is required to receive a request from the contract partner and manually register the setting difference. Even when the contract partner performs the registration of the setting difference, a person on the contract partner side is required to access the system on the vendor side and register the setting difference. For this reason, in the related-art technology, at least one of the vendor or the contract partner has an increased workload.

SUMMARY OF THE INVENTION

One object of the present disclosure is to reduce a workload of at least one of a vendor or a contract partner.

According to at least one aspect of the present disclosure, there is provided a multi-tenant system including at least one processor configured to: acquire, from a contract partner system of a contract partner contracted with a vendor of a multi-tenant service, customization information relating to customization specific to the contract partner; execute the customization based on the customization information; and provide a customized service, which is the multi-tenant service on which the customization has been executed, to a user who has performed a predetermined usage application.

BRIEF DESCRIPTION OF THE DRAWINGS

FIG. 7 is a table for showing an example of a service database.

DESCRIPTION OF THE EMBODIMENTS

1. Hardware Configuration of Multi-Tenant System

Figure 1:
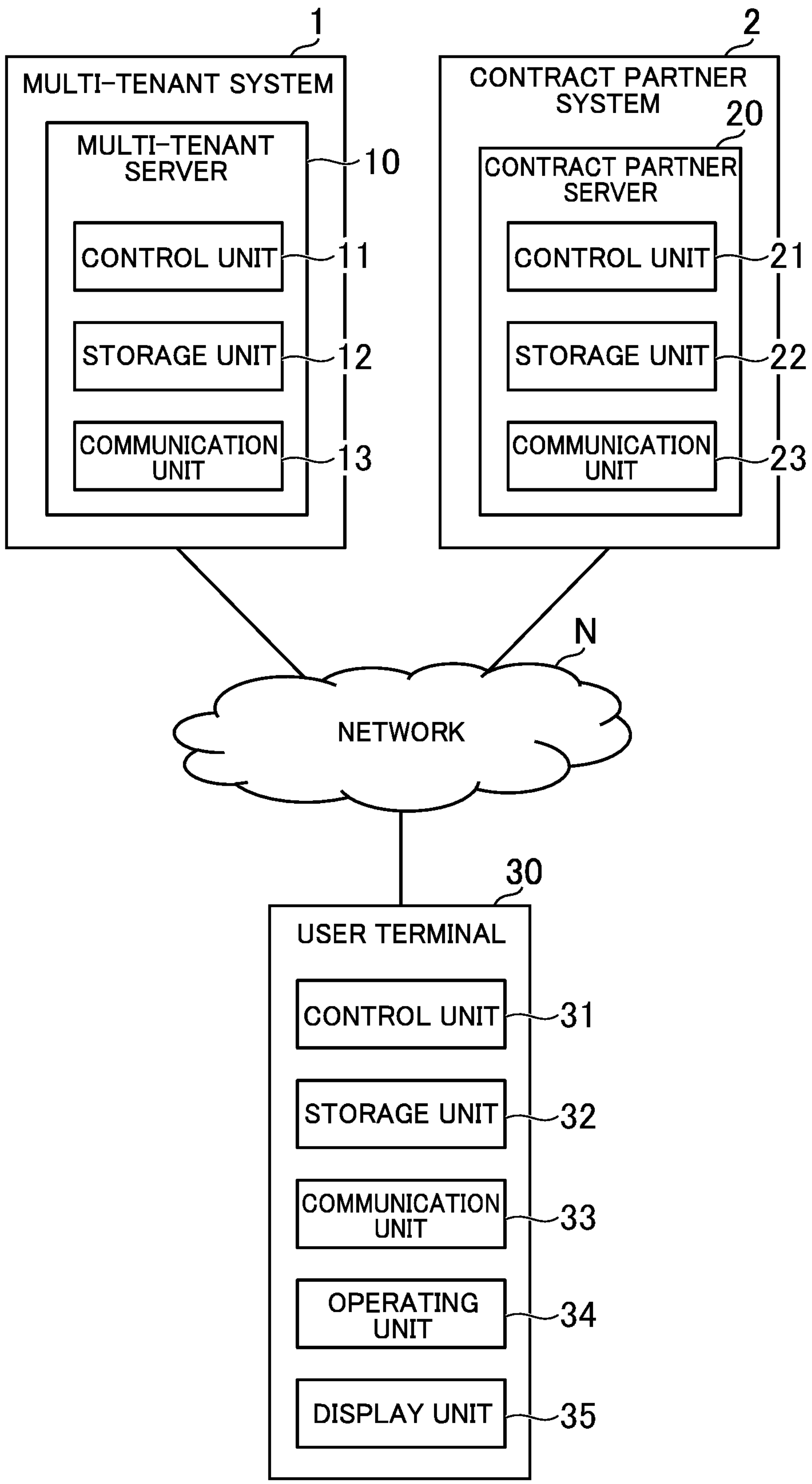
FIG. 1 is a diagram for illustrating an example of a hardware configuration of a multi-tenant system.

An example of at least one embodiment of a multi-tenant system according to the present disclosure is now described. FIG. 1 is a diagram for illustrating an example of a hardware configuration of the multi-tenant system. For example, a multi-tenant system 1 includes a multi-tenant server 10. The multi-tenant system 1 is connected to a network N, such as the Internet or a LAN. For example, the network N is connected to a contract partner system 2 and a user terminal 30.

The multi-tenant server 10 is a server computer. For example, the multi-tenant server 10 includes a control unit 11, a storage unit 12, and a communication unit 13. The control unit 11 includes at least one processor. The storage unit 12 includes a volatile memory such as a RAM, and a non-volatile memory such as a flash memory. The communication unit 13 includes at least one of a communication interface for wired communication or a communication interface for wireless communication.

For example, the contract partner system 2 includes a contract partner server 20. The contract partner server 20 is a server computer. For example, the contract partner server 20 includes a control unit 21, a storage unit 22, and a communication unit 23. Hardware configurations of the control unit 21, the storage unit 22, and the communication unit 23 may be the same as those of the control unit 11, the storage unit 12, and the communication unit 13, respectively.

The user terminal 30 is a computer of a user. For example, the user terminal 30 is a personal computer, a tablet terminal, or a smartphone. For example, the user terminal 30 includes a control unit 31, a storage unit 32, a communication unit 33, an operating unit 34, and a display unit 35. Hardware configurations of the control unit 31, the storage unit 32, and the communication unit 33 may be the same as those of the control unit 11, the storage unit 12, and the communication unit 13, respectively. The operating unit 34 is an input device such as a touch panel. The display unit 35 is a liquid crystal display or an organic EL display.

Programs stored in the storage units 12, 22, and 32 may be supplied through the network N. Further, hardware configurations of the multi-tenant server 10, the contract partner server 20, and the user terminal 30 are not limited to the examples of FIG. 1. For example, a reading unit (for example, optical disc drive or memory card slot) for reading a computer-readable information storage medium or an input/output unit (for example, USB terminal) for directly connecting to an external device may be included. In this case, programs stored in the information storage medium may be supplied through intermediation of the reading unit or the input/output unit.

Further, the multi-tenant system 1 is only required to include at least one computer. The computers included in the multi-tenant system 1 are not limited to the example of FIG. 1. For example, the multi-tenant system 1 may include the multi-tenant server 10 and another server computer. The multi-tenant system 1 may include a computer other than the server computer (for example, a computer operated by a staff member of the vendor).

Further, the contract partner system 2 is only required to include at least one computer. The computers included in the contract partner system 2 are not limited to the example of FIG. 1. For example, the contract partner system 2 may include the contract partner server 20 and another server computer. The contract partner system 2 may include a computer other than the server computer (for example, a computer operated by a staff member of the contract partner). In FIG. 1, only one user terminal 30 is illustrated, but a plurality of user terminals 30 may exist.

2. Outline of Multi-Tenant System

In the at least one embodiment, the multi-tenant system 1 provides a service to multiple tenants. Multi-tenancy is an architecture for providing a service to a plurality of users in a common environment. The plurality of users are, in principle, parties unrelated to each other. Parties unrelated to each other are parties who do not belong to the same or a related organization. The plurality of users may be individuals who do not belong to an organization in the first place. For example, in the multi-tenant system 1, the service is provided to each of a first user A belonging to a first organization and a second user B belonging to a second organization, which is unrelated to the first organization, under an environment that is common to the first user A and the second user B.

As used herein, "environment" refers to at least one of the hardware, software, or APIs that are used to provide the service. In the at least one embodiment, the service is provided to each of a plurality of users unrelated to each other (for example, a plurality of users who do not belong to the same organization) based on at least one of the same hardware, software, or data. A part of the functions of the service may be customized for each individual user, but the rough architecture itself for providing the service is common to the plurality of users.

For example, the service is provided to each of the plurality of users based on the same hardware, that is, the multi-tenant server 10. However, a plurality of pieces of hardware for providing the service to the plurality of users may be different from each other. In this case, the plurality of pieces of hardware are managed by the same vendor. For example, the first user A may be provided with the service based on a first hardware, and the service may be provided to the second user B based on a second hardware managed by the vendor that manages the first hardware.

For example, the service is provided to each of the plurality of users based on the same software stored on the multi-tenant server 10. However, a plurality of pieces of software for providing the service to the plurality of users may differ from each other to some extent. In this case, a given software may have been developed by utilizing other software. For example, the service to the second user B may be provided based on a second software in which a part of the functions of first software for providing the service to the first user A have been customized.

For example, the service is provided to each of the plurality of users based on the same API that the multi-tenant server 10 has. However, it is not required that a plurality of APIs for providing the service to the plurality of users be exactly the same as each other, and those plurality of APIs may be different from each other. In this case, a given API is developed by utilizing another API. For example, the service to the second user B may be provided based on a second API in which a part of a first API for providing the service to the first user A has been customized.

In the at least one embodiment, as an example of the service provided to multiple tenants, a task support service for supporting a task is described. The task support service is sometimes called "groupware." The multi-tenant system 1 is also applicable to services other than the task support service. Examples of the services to which the multi-tenant system 1 may be applied are not limited to a task support service. For example, the multi-tenant system 1 is also applicable to other services such as an online storage service, a webmail service, a web conferencing service, or an online seminar service.

For example, the vendor of the task support service manages the multi-tenant system 1. The vendor is the company that developed the task support service. A contract partner contracted with the vendor manages the contract partner system 2. In the at least one embodiment, a case in which the contract partner is an original equipment manufacturer (OEM) that has concluded an original equipment manufacturing contract with the vendor is described as an example, but the contract partner may be any party that has concluded some sort of contract with the vendor. For example, a contract other than an OEM contract, such as a partner contract, a distributor contract, an intermediary contract, or subcontracting contract, may be concluded between the vendor and the contract partner.

In the at least one embodiment, a case in which the vendor provides a cloud-type task support service (so-called "SaaS") is described as an example, but the task support service may be an on-premises type, and is not limited to a cloud type. For example, a vendor "AAA Corporation" provides a task support service called "AAA Work" under its own name. "BBB Corporation," which is a contract partner that has concluded an OEM contract with the vendor, provides a task support service called "BBB work powered by AAA work" based on the "AAA work."

In the following description, the original task support service "AAA work" provided by the vendor is referred to as "original service." The task support service "BBB work powered by AAA work" provided by the contract partner is referred to as a "customized service." The original service and the customized service are provided to multiple tenants, and hence the original service and the customized service are in principle provided under the same environment. When the original service and the customized service are not distinguished, the term "service" is simply used. Customization by the vendor of the task support service "AAA work" for the contract partner is also a type of service. That service can be referred to as customization (not "customized") service.

For example, the user can use at least one of the original service or the customized service. The user may use both the original service and the customized service, or may use only one of the original service and the customized service. In the case of using at least one of the original service or the customized service, the user is required to perform a usage application. For example, in the case of using the original service, the user accesses the multi-tenant server 10 and performs a usage application.

Figure 2:
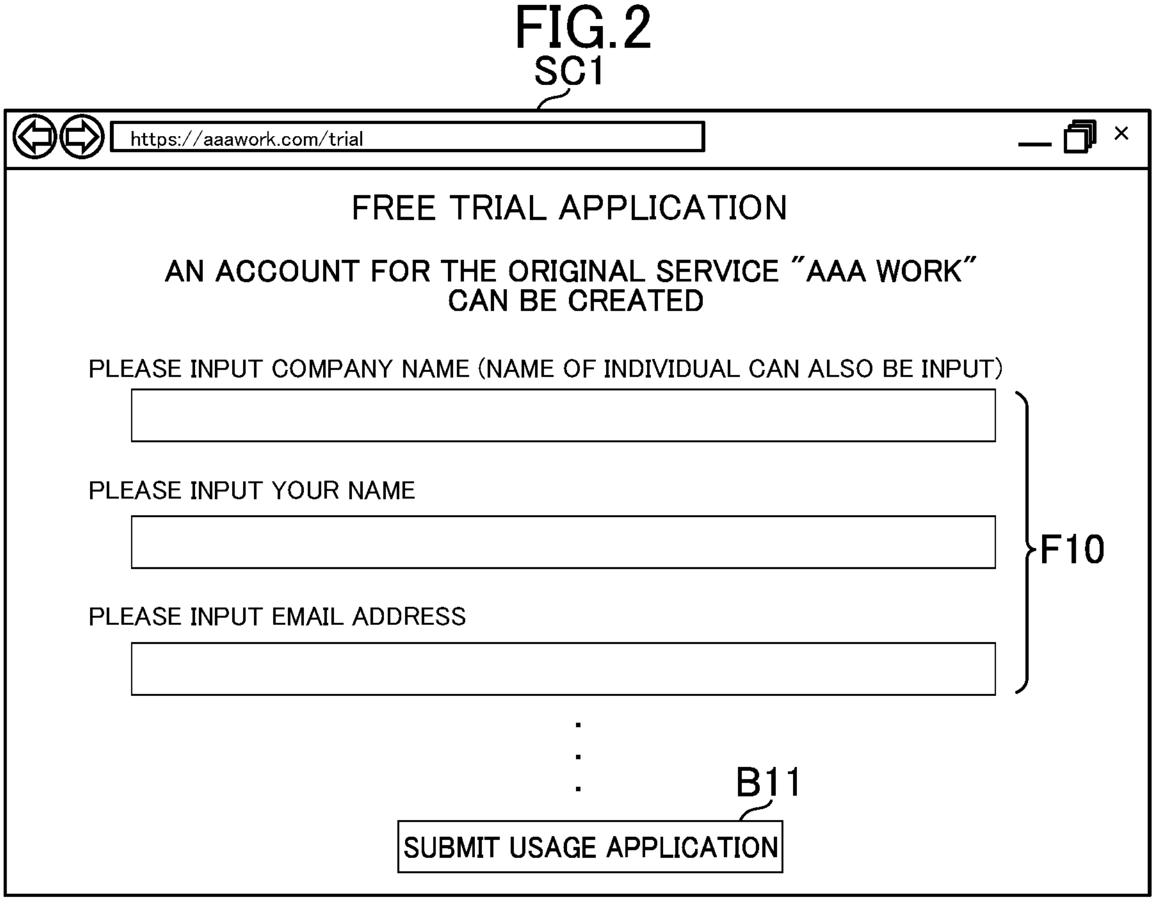
FIG. 2 is a diagram for illustrating an example of a usage application screen for receiving a usage application for an original service.

FIG. 2 is a diagram for illustrating an example of a usage application screen for receiving the usage application for the original service. In the at least one embodiment, a case in which the original service has a free trial period is described, but it is not required that the original service have a trial period in particular. For example, when the user accesses the multi-tenant server 10 by operating the user terminal 30 under a state in which the user has not registered to use the original service, an original service usage application screen SC1 is displayed on the display unit 35.

In the example of FIG. 2, the original service usage application screen SC1 is displayed on a domain of the vendor such as "aaawork.com." For example, the user inputs items required for the usage application, such as company name, full name of the user, and email address, in an input form F10. When the user selects a button B11, the usage application for the original service is complete. When the multi-tenant server 10 receives the usage application, the multi-tenant server 10 creates an environment for the user to try the original service. For example, the multi-tenant server 10 creates at least one of a user-dedicated subdomain or a rough screen layout as the environment of the original service.

For example, when the environment of the original service is created, the user can access the subdomain assigned to the user, and use the original service. The user logs in to the original service based on a user ID and password registered at the time of performing the usage application. The user may also customize the original service as required. For example, when the user logs in to the original service, a portal screen of the original service is displayed on the display unit 35.

Figure 3:
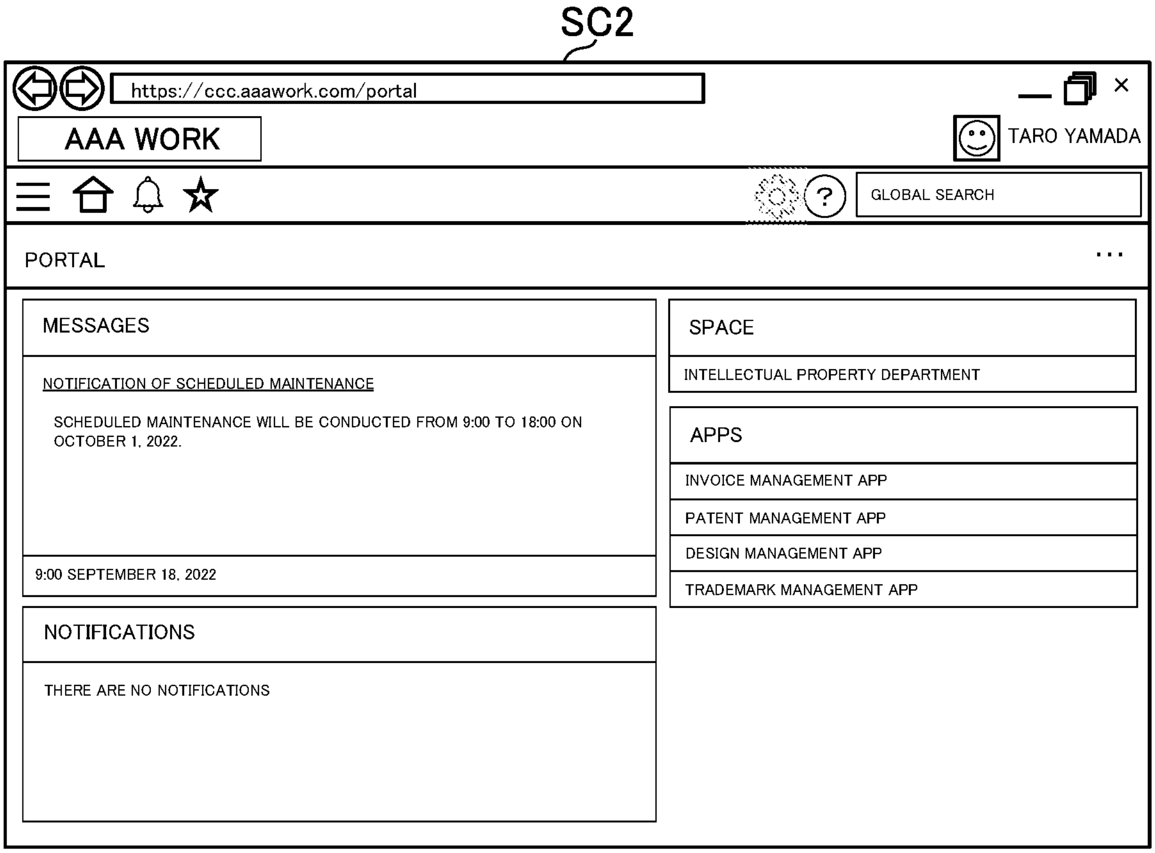
FIG. 3 is a diagram for illustrating an example of a portal screen of the original service.

FIG. 3 is a diagram for illustrating an example of the portal screen of the original service. In the example of FIG. 3, a user "Taro Yamada" belonging to "CCC Corporation" has logged in to the original service. A URL corresponding to a portal screen SC2 of the original service includes a subdomain "ccc.aaawork.com" to which a character string "ccc." is added before the domain "aaawork.com." The subdomain is not required to be a character string from which the organization of the user can be identified, and the subdomain may be any character string. For example, the subdomain may contain a randomly generated character string.

For example, the user "Taro Yamada" has administrator privileges for the original service provided by the subdomain "ccc.aaawork.com." The user "Taro Yamada" invites another user belonging to "CCC Corporation" to a user group referred to as "space." The other user receives the invitation from the user "Taro Yamada," and performs a procedure for joining the space. For example, the other user inputs information required to join the space, such as their full name and email address. When the other user has joined the space, the other user can use the original service.

For example, the users belonging to the space post comments on a type of bulletin board called "thread," and communicate with each other. For example, the users belonging to the space register data in a type of database called "app," and share information required for a task. For example, the users belonging to the space share their own schedules. Those functions may be performed at a location unrelated to the space rather than between the users belonging to the space. The functions themselves provided by the original service may be various functions that are publicly known.

In the at least one embodiment, such an original service is customized and provided as a customized service under the name of the contract partner. The customized service is provided by the contract partner, and thus the user performs usage registration with the contract partner, not the vendor. However, the customized service itself is not developed independently by the contract partner, and utilizes functions developed by the vendor. For example, when the user uses the customized service, the user accesses the contract partner server 20 and performs a predetermined usage application.

Figure 4:
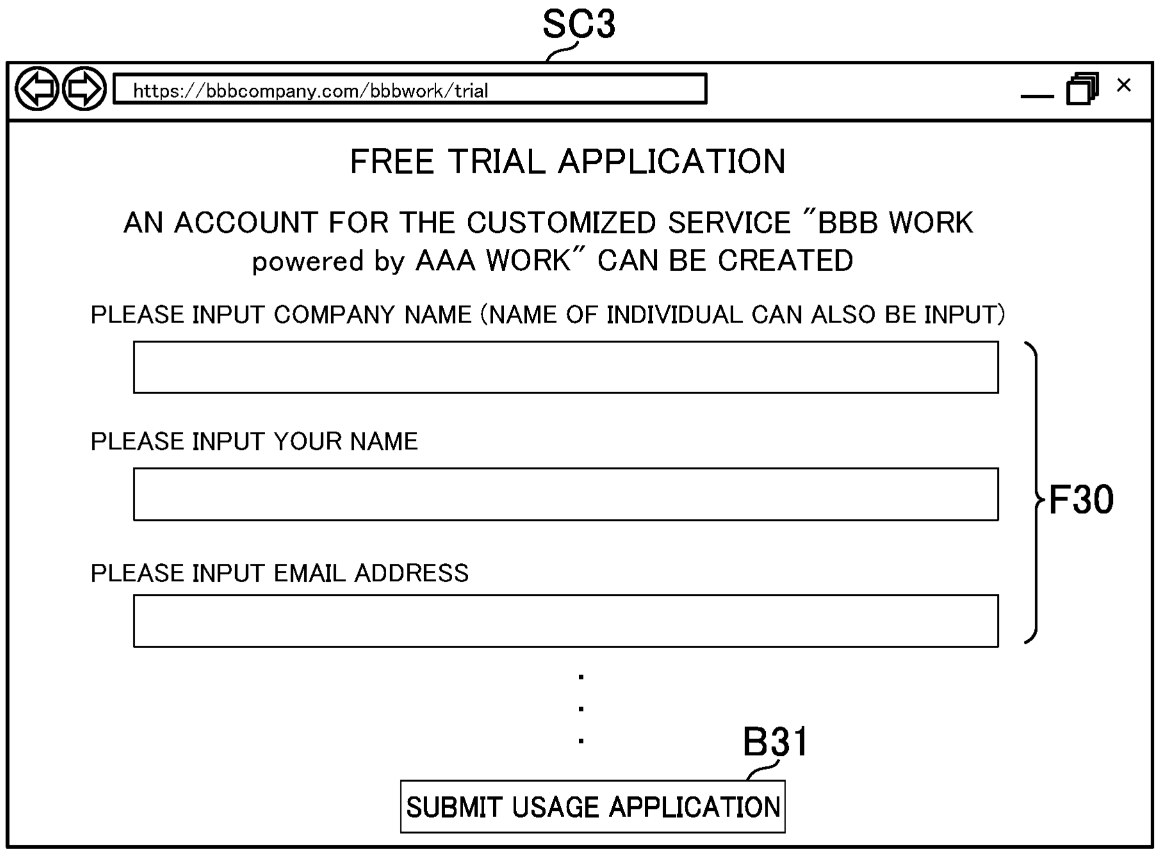
FIG. 4 is a diagram for illustrating an example of a usage application screen for receiving a usage application for a customized service.

FIG. 4 is a diagram for illustrating an example of a usage application screen for receiving the usage application for the customized service. In the at least one embodiment, a case in which the customized service has a free trial period is described, but it is not required that the customized service have a trial period in particular. The customized service is provided under the name of the contract partner, and thus the user is required to access the contract partner server 20 in order to perform the usage application for the customized service. In the example of FIG. 4, a customized service usage application screen SC3 is displayed on a domain of the contract partner such as "bbbcompany.com."

For example, the user inputs items required for the usage application, such as company name, full name of the user, and email address, in an input form F30. In the at least one embodiment, a case in which the items required for the usage application for the customized service and the items required for the usage application for the original service are the same is described, but those required items may be different from each other. For example, for the usage application for the customized service, there may be items required in order to execute customization for the customized service. This point is described in modification examples described later.

For example, when the user inputs the required items for the usage application and selects a button B31, the usage application for the customized service is complete. The usage application for the customized service is performed with respect to the contract partner server 20, but the customized service itself is provided by the multi-tenant server 10, and not the contract partner server 20. Thus, the contract partner server requests the multi-tenant server 10 to create an environment for the user to try the customized service.

For example, when the multi-tenant server 10 receives the request from the contract partner server 20, the multi-tenant server 10 creates at least one of a user-dedicated subdomain or a rough screen layout as the environment of the customized service. The flow for creating the environment is basically the same as the flow when the usage application for the original service is performed. However, the customized service has functions corresponding to the contract partner, and hence customization corresponding to the contract partner is executed after the rough environment is created.

For example, when the multi-tenant server 10 creates the environment of the customized service, the multi-tenant server executes customization specific to the customized service between the multi-tenant server 10 and the contract partner server 20. In the at least one embodiment, a case in which a detailed screen layout corresponding to the contract partner is executed as the customization is described, but customization other than customization of the screen layout may be executed. Other examples of customization are described in the modification examples described later.

For example, after the customization of the customized service is complete, the user can access the subdomain assigned to the user, and use the customized service. Even in the customized service, the user registers a user ID and a password at the time of performing the usage application. The user logs in to the customized service based on a user ID and password registered at the time of performing the usage application. For example, when the user logs in to the customized service, a portal screen of the customized service is displayed on the display unit 35.

Figure 5:
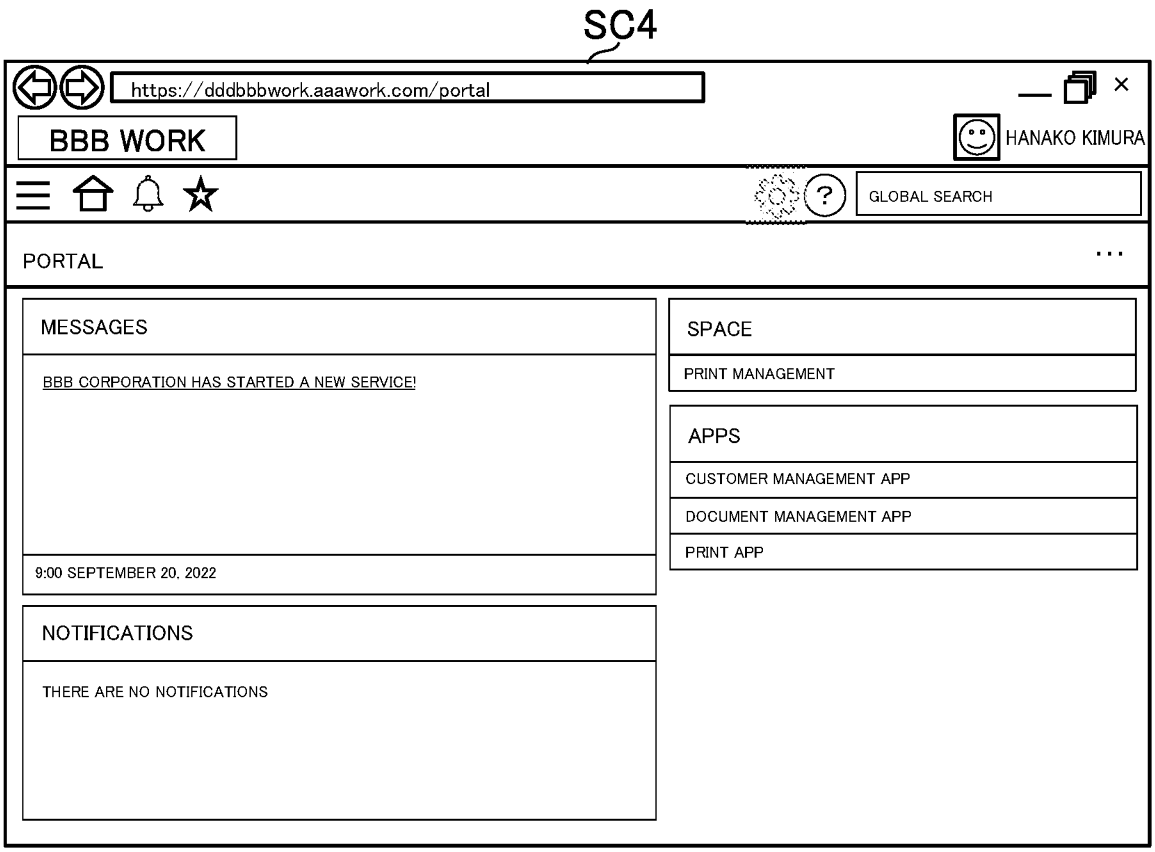
FIG. 5 is a diagram for illustrating an example of a portal screen of the customized service.

FIG. 5 is a diagram for illustrating an example of the portal screen of the customized service. In the example of FIG. 5, a user "Hanako Kimura" belonging to "DDD Corporation" has logged in to the customized service. A URL corresponding to a portal screen SC4 of the customized service includes a subdomain "dddbbbwork.aaawork.com" to which a character string "dddbbbwork." is added before the domain "aaawork.com." The subdomain is not required to be a character string from which the organization of the user and the contract partner can be identified, and the subdomain may be any character string. For example, the subdomain may contain a randomly generated character string.

As illustrated in FIG. 5, the customized service portal screen SC4 has a different layout from that of the original service portal screen SC2. For example, the customized service portal screen SC4 displays a logo such as "BBB Work" so that the service can be recognized as being a customized service. The customized service portal screen SC4 may have a background in the company color of the contract partner, or may use an image showing the company name of the contract partner as the background. For example, in a "Messages" box of the customized service portal screen SC4, information on a product of the contract partner is displayed.

For example, when some sort of inquiry is performed from the customized service portal screen SC4, the contract partner, not the vendor, is set as the inquiry destination. Meanwhile, the inquiry destination on the original service portal screen SC2 is the vendor. The screens other than the portal screen SC4 displayed by the customized service also have layouts specific to the contract partner. The user "Hanako Kimura" invites another user belonging to "DDD Corporation" to the space. This point is the same as the procedure for starting usage of the original service.

For example, with the customized service, task support specific to a product of the contract partner can be provided. In a case in which the contract partner is a company that sells devices such as scanners or multi-function printers, a customized service that specializes in task support for document management is provided. In the at least one embodiment, customization of the screen layout is described as an example, but a database called "app" or functions such as a plug-in may be customized. A user who wants to use the task support service specialized for document management task support performs the usage application for the customized service.

As described above, when the multi-tenant server 10 in the at least one embodiment receives a usage application for a customized service, the multi-tenant server 10 automatically executes, together with the contract partner server 20, creation of the environment for the customized service and customization specific to the customized service. As a result, it is not required to perform a manual operation between the vendor and the contract partner, and the workload of at least one of the vendor or the contract partner can be reduced. Details of the multi-tenant system 1 are described below.

3. Functions Implemented by Multi-Tenant System

Figure 6:
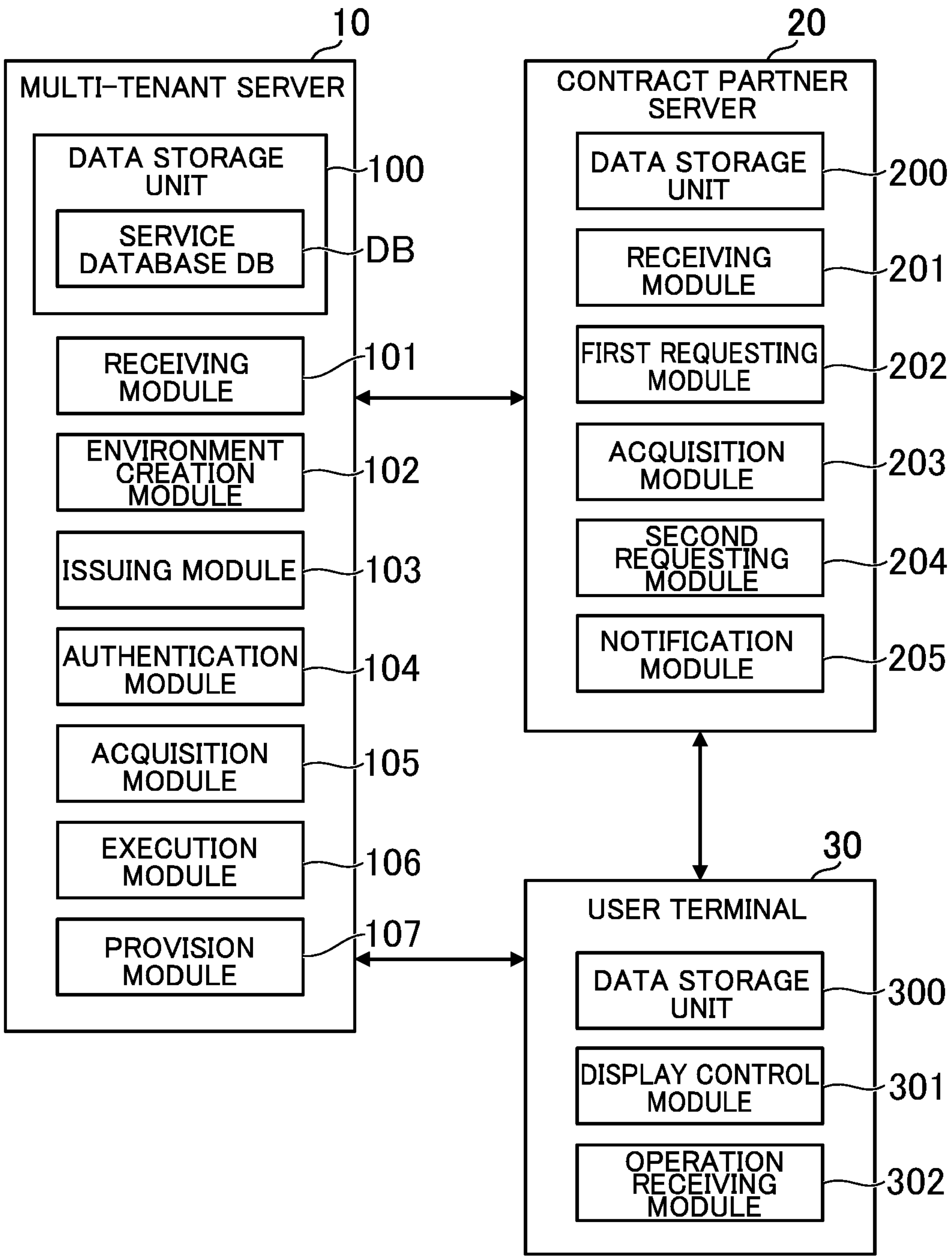
FIG. 6 is a function block diagram for illustrating functions implemented by the multi-tenant system.

FIG. 6 is a function block diagram for illustrating functions implemented by the multi-tenant system 1. In FIG. 6, not only the functions of the multi-tenant system 1 but also the functions implemented by each of the contract partner system 2 and the user terminal 30 are illustrated.

[3-1. Functions Implemented by Multi-Tenant Server]

For example, the multi-tenant server 10 includes a data storage unit 100, a receiving module 101, an environment creation module 102, an issuing module 103, an authentication module 104, an acquisition module 105, an execution module 106, and a provision module 107. The data storage unit 100 is implemented by the storage unit 12. The receiving module 101, the environment creation module 102, the issuing module 103, the authentication module 104, the acquisition module 105, the execution module 106, and the provision module 107 are each implemented by the control unit 11.

[Data Storage Unit]

The data storage unit 100 stores data required for providing the service to multiple tenants. For example, the data storage unit 100 stores a service database DB.

FIG. 7 is a table for showing an example of the service database DB. The service database DB is a database in which various types of information relating to customized services are stored. For example, the service database DB stores contract partner information that can identify the contract partner, and environment information relating to the environment of the customized service. For example, the contract partner information is the name of the contract partner, the ID assigned to the contract partner, or the email address of the contract partner.

The environment information may be any information relating to the environment of the customized service. For example, the environment information includes subdomains, layout information, space information, app information, and thread information. For example, a subdomain is information that identifies a usage unit of a customized service. A subdomain is generated each time a usage application is performed. The subdomain can be changed at a later time.

The layout information is information relating to the layout of various screens such as the portal screens SC2 and SC4. For example, the layout information includes information on a background, icons, and a header of the various screens such as the portal screens SC2 and SC4. The space information is information relating to the space. For example, the space information includes the name of the space, the user ID of the user belonging to the space, and user permissions. The space information may include information such as messages exchanged in the space.

The app information is information relating to apps associated with the space. In the at least one embodiment, "app" is used more in the sense of a database than software. For example, information shared by the users belonging to the space is registered in the app. The users belonging to the space can view, update, or delete the information registered in the application within the scope of the permission granted to the user. An app may be registered in a location unrelated to the space. The thread information is information relating to a thread, which is a type of bulletin board. For example, the thread information includes the title of the thread, comments posted on the thread, and attached files.

The service database DB is not limited to the example of FIG. 7, as long as the service database DB stores some information relating to the customized service. For example, the name of the company to which the user who has performed the usage application belongs, the name of the user, the email address of the user, the business scale of the organization to which the user belongs, or other information on the usage purpose of the customized service may be stored in the service database DB. For example, the user IDs and passwords of the users who use the customized service (other users invited by the user who has performed the usage application) may be stored in the service database DB.

For example, the user ID and password of the contract partner may be stored in the service database DB. In the at least one embodiment, the contract partner is assumed to be one of the users having administrator privileges. The user who has performed the usage application for the original service also has administrator privileges, and hence the user who has performed the usage application for the original service is one of the users who has administrator privileges, but in the at least one embodiment, the user who has performed the usage application for the original service is considered as being one of the other users invited by the contract partner. For example, the contract partner logs in with the user ID and password issued to the contract partner, and various types of processing relating to customization are executed.

Further, the data storage unit 100 may store data exchanged in the customized service. For example, the data storage unit 100 may store data of records registered in the apps of the customized service and data of comments posted in the threads of the customized service. The data storage unit 100 may store data relating to the original service. The data storage unit 100 is only required to store the data required for providing the multi-tenant service. The data stored in the data storage unit 100 is not limited to the above-mentioned examples. For example, the data storage unit 100 may store data relating to various APIs.

[Receiving Module]

The receiving module 101 receives a predetermined usage application for applying to use a customized service. In the at least one embodiment, usage applications are performed on the contract partner system 2, and thus when a usage application is performed on the contract partner system 2, the receiving module 101 receives the predetermined usage application from the contract partner system 2. The usage application is performed by transmitting data having a predetermined format. For example, the usage application may include information on the user who has performed the usage application. When usage applications for a customized service are also performed on the multi-tenant system 1, the receiving module 101 directly receives the usage application from the user terminal 30. When usage applications for a customized service are also performed on a system other than the multi-tenant system 1 and the contract partner system 2, the receiving module 101 receives the usage application via the other system.

In the at least one embodiment, the receiving module 101 receives usage applications from the contract partner system 2 based on an environment creation API for creating the environment. When the user performs a usage application from the customized service usage application screen SC3, the contract partner server 20 transmits the usage application to the environment creation API of the multi-tenant server 10. The usage application is turned into data having a format defined by the environment creation API. The usage application may be received by an API different from the environment creation API, or may be directly transmitted from the user terminal 30 to the multi-tenant server 10.

[Environment Creation Module]

The environment creation module 102 creates the environment for the customized service when a usage application is received. As used herein, "creates the environment" means generating the data relating to the customized service and storing the generated data in the service database DB. The environment created by the environment creation module 102 is different from the customization by the execution module 106 described later. The environment creation module 102 performs general settings of the customized service, and the execution module 106, which is described later, performs detailed settings of the customized service. The items to be set by the environment creation module 102 are assumed to be determined in advance. When the environment creation module 102 creates the environment, a new record is created in the service database DB, and various types of information relating to the created environment are stored therein.

For example, the environment creation module 102 creates a subdomain for the customized service. The subdomain may contain a character string that can identify the contract partner. In this case, when the usage application is for a customized service, the environment creation module 102 creates a subdomain containing a character string. The environment creation module 102 determines the rough layout of the customized service portal screen SC4. For example, the rough layout is the header portion and the background of the customized service portal screen SC4. The environment creation module 102 creates the environment for the customized service such that the company name or logo of the contract partner is included in the header portion of the customized service portal screen SC4.

[Issuing Module]

The issuing module 103 issues predetermined authentication information when the user performs a usage application. The authentication information is information that is used for authentication of the contract partner. In the at least one embodiment, a case in which a password corresponds to the authentication information is described, but the authentication information may be other information and is not limited to a password. For example, the authentication information may be a personal identification number, a countersign, or a digital certificate. The issuing module 103 issues the authentication information based on an issuing method determined in advance. The issued authentication information is stored in the service database DB or another database. The authentication information is issued so as to avoid duplication with other authentication information that has already been issued.

In the at least one embodiment, a case in which a password is issued based on a URL for password issuance is described as an example. For example, the issuing module 103 receives access to the URL for password issuance, and newly issues a password input on the page of the URL. The issuing module 103 may issue the password randomly instead of accessing a URL for password issuing. The issuing module 103 stores the issued password in the service database DB. In the case of a customized service, it is assumed that the processing of issuing the password is automated based on processing by the contract partner server 20.

[Authentication Module]

The authentication module 104 executes authentication relating to the contract partner system 2 based on the authentication information. The authentication module 104 executes authentication based on the authentication information received from the contract partner system 2 and the authentication information issued by the issuing module 103 and held on the multi-tenant server 10 side (for example, authentication information stored in the service database DB). Authentication is successful when those pieces of authentication information match. The authentication itself can use any authentication method, and is not limited to password authentication. For example, personal identification number authentication, countersign authentication, or digital certificate authentication may be executed. When authenticating the user instead of the contract partner, the authentication module 104 executes authentication based on the authentication information received from the user terminal 30 and the authentication information issued by the issuing module 103 and held on the multi-tenant server 10 side.

[Acquisition Module]

The acquisition module 105 acquires, from the contract partner system 2 of the contract partner contracted with the vendor of the service, customization information relating to customization specific to the contract partner. In the at least one embodiment, it is assumed that a dedicated API for acquiring the customization information is prepared. For example, the acquisition module 105 acquires the customization information from the contract partner system 2 based on a customization API, which is different from the environment creation API. The contract partner server 20 uses the customization API to transmit the customization information to the multi-tenant server 10. In the at least one embodiment, in the contract partner system 2, the customization information is generated based on an environment creation result. The acquisition module 105 acquires the customization information generated based on the environment creation result. For example, authentication information is issued when creation of an environment is successful, and thus the acquisition module 105 acquires customization information from the contract partner system 2 when authentication is successful. The acquisition module 105 does not acquire customization information from the contract partner system 2 when the authentication is not successful.

The customization information includes information that can identify what kind of customization is to be executed on the customized service. As the customization itself, any processing corresponding to the contract partner can be executed. In the at least one embodiment, customization relating to the layout of the portal screen SC4 is executed, and thus the customization information includes information relating to the layout of the portal screen SC4. For example, the acquisition module 105 acquires customization information relating to the layout, such as the logo and background of the portal screen SC4.

[Execution Module]

The execution module 106 executes customization based on the customization information. In the at least one embodiment, customization of layout information is described as an example of customization. Thus, the customization information includes layout information. For example, the execution module 106 stores the layout information included in the customization information received from the contract partner system 2 in the service database DB. The layout information is reflected in each screen, such as the portal screen SC4.

In the at least one embodiment, a task support service for supporting a task is described as an example of the service, and hence the customization is customization specific to a task relating to a customized service independently provided by the contract partner. For example, in the customization, at least one of processing of displaying information on a product of the contract partner in the "Messages" box of the portal screen SC4, processing of setting the company color of the contract partner as the background, or processing of displaying the logo of the contract partner on a screen such as the portal screen SC4, is executed.

In the at least one embodiment, layout information is exchanged by using the customization API. The customization API is also used when some sort of customization is executed on the original service. Thus, the execution module 106 executes customization by utilizing the same customization API as the original service, which is the service originally provided by the vendor. For example, the customization API for the original service and the customization API for the customized service are the same. Accordingly, the data formats received by those APIs are also the same.

[Provision Module]

The provision module 107 provides a customized service, which is a service that has been customized, to a user who has performed a predetermined usage application. In the at least one embodiment, a case in which the usage application is performed on the contract partner system 2 is described, but the usage application may be performed on the multi-tenant system 1. For example, a usage application for a customized service may be selectable on the same usage application screen SC1 as the usage application for the original service. The usage application for a customized service may be performed on another system (for example, a system belonging to an agent) other than the multi-tenant system 1 and the contract partner system 2. In this case, the multi-tenant system 1 receives from the another system a notification indicating that a usage application for a customized service has been performed.

For example, the provision module 107 displays the customized service portal screen SC4 on the user terminal 30 when the user who has performed the usage application or another user invited by the user has logged in by inputting his or her own user ID and password. This portal screen SC4 has been customized specifically for the contract partner. Thus, the provision module 107 provides a customized service that reflects the customization to the user. In the at least one embodiment, multi-tenancy is implemented, and thus the provision module 107 also provides the original service to the user. The provision of the customized service is executed based on the data stored in the service database DB or another database.

[3-2. Functions implemented by Contract Partner System]

For example, the contract partner system 2 includes a data storage unit 200, a receiving module 201, a first requesting module 202, an acquisition module 203, a second requesting module 204, and a notification module 205. The data storage unit 200 is implemented by the storage unit 22. The receiving module 201, the first requesting module 202, the acquisition module 203, the second requesting module 204, and the notification module 205 are each implemented by the control unit 21.

[Data Storage Unit]

The data storage unit 200 stores data required for providing the customized service. For example, the data storage unit 200 stores data for displaying the customized service usage application screen SC3 on the user terminal 30. In the at least one embodiment, the data storage unit 200 stores the customization information. The customization information can be updated as appropriate by an operation by a staff member of the contract partner. For example, the data storage unit 200 stores the layout information relating to the layout of the portal screen SC4 as the customization information. The customization information may include information other than the layout information. The data storage unit 200 is not required to store the customization information itself, and may store data for generating the customization information.

[Receiving Module]

The receiving module 201 receives the usage application for the customized service. In the at least one embodiment, a case in which the usage application is transmitted from the user terminal 30 is described, but the usage application may be transmitted from a terminal other than the user terminal 30. For example, when a staff member of the contract partner performs a usage application on behalf of a user, the usage application may be transmitted from the terminal of the staff member. The usage application is performed by transmitting data having a predetermined format. The usage application includes information required to start using the customized service. For example, the usage application includes various types of information input to the input form F30 of the customized service usage application screen SC3.

[First Requesting Module]

The first requesting module 202 transmits to the multi-tenant server 10 an environment creation request for creating a customized service environment. The environment creation request is performed by transmitting data having a predetermined format. The environment creation request includes information required to create the customized service environment. For example, the environment creation request includes service identification information that can identify that the service is a customized service. The service identification information may be any information based on which the service can be distinguished from the original service. The service identification information is expressed as, for example, predetermined characters, symbols, numbers, or a combination thereof.

In the at least one embodiment, the environment creation API and the customization API are prepared as separate APIs, and thus the first requesting module 202 transmits the environment creation request for a customized service to the environment creation API of the multi-tenant server 10. The environment creation request has a data format that conforms to the environment creation API. This data format is basically the same as an environment creation request for the original service. Thus, the environment creation API can handle both an environment creation request for a customized service and an environment creation request for the original service.

[Acquisition Module]

The acquisition module 203 acquires the customization information based on an acquisition method determined in advance. In the at least one embodiment, the customization information itself is stored in the data storage unit 200, and hence the acquisition module 203 acquires the customization information stored in the data storage unit 200. The customization information stored in the data storage unit 200 can be changed as appropriate by a staff member of the contract partner. The customization information is not required to be recorded in the multi-tenant server 10, and thus when changing the layout of the customized service portal screen SC4, the staff member of the contract partner is not required to request the vendor to change the customization information. As a result, the workload of both the vendor and the contract partner can be reduced. The customization information may be obtained based on the environment result of the customized service, or may be acquired regardless of the environment of the customized service.

[Second Requesting Module]

The second requesting module 204 transmits to the multi-tenant server 10 a customization request for executing customization specific to the customized service. The customization request is performed by transmitting data having a predetermined format. The customization request includes information required to execute customization. For example, the customization request includes the user ID of the contract partner and the customization information.

In the at least one embodiment, the environment creation API and the customization API are prepared as separate APIs, and thus the second requesting module 204 transmits the customization request to the customization API of the multi-tenant server 10. The customization request has a data format that conforms to the customization API. This data format is basically the same as that in the case in which some customization is executed in the original service. Thus, the customization API can handle both a customization request for a customized service and a customization request for the original service.

[Notification Module]

The notification module 205 notifies the user terminal 30 of usage start. The notification of usage start includes a link to the customized service portal screen SC4. When the password of the user is to be registered at a later time, the notification of usage start may include a link to a password registration page. The notification module 205 may perform the notification of usage start by using any notification means. As used herein, "notification means" may be email, a message app, an SMS, or a chat.

[3-3. Functions implemented by User Terminal]

For example, the user terminal 30 includes a data storage unit 300, a display control module 301, and an operation receiving module 302. The data storage unit 300 is implemented by the storage unit 32. The display control module 301 and the operation receiving module 302 are each implemented by the control unit 31.

[Data Storage Unit]

The data storage unit 300 stores data required for supporting users in tasks. For example, the data storage unit 300 stores a browser for displaying various screens relating to the multi-tenant system 1. For example, the data storage unit 300 stores an application dedicated to the multi-tenant system 1.

[Display Control Module]

The display control module 301 displays the various screens in the multi-tenant system 1 on the display unit 35. For example, the display control module 301 displays the original service usage application screen SC1, the original service portal screen SC2, the customized service usage application screen SC3, and the customized service portal screen SC4 on the display unit 35 based on the display data received from the multi-tenant server 10.

[Operation Receiving Module]

The operation receiving module 302 receives various operations by the user. For example, the operation receiving module 302 receives an operation performed on each of the original service usage application screen SC1, the original service portal screen SC2, the customized service usage application screen SC3, or the customized service portal screen SC4. Details of the operation received by the operation receiving module 302 are transmitted to the multi-tenant server or the contract partner server 20 as appropriate.

4. Processing to be Executed by Multi-Tenant System

Figure 8:
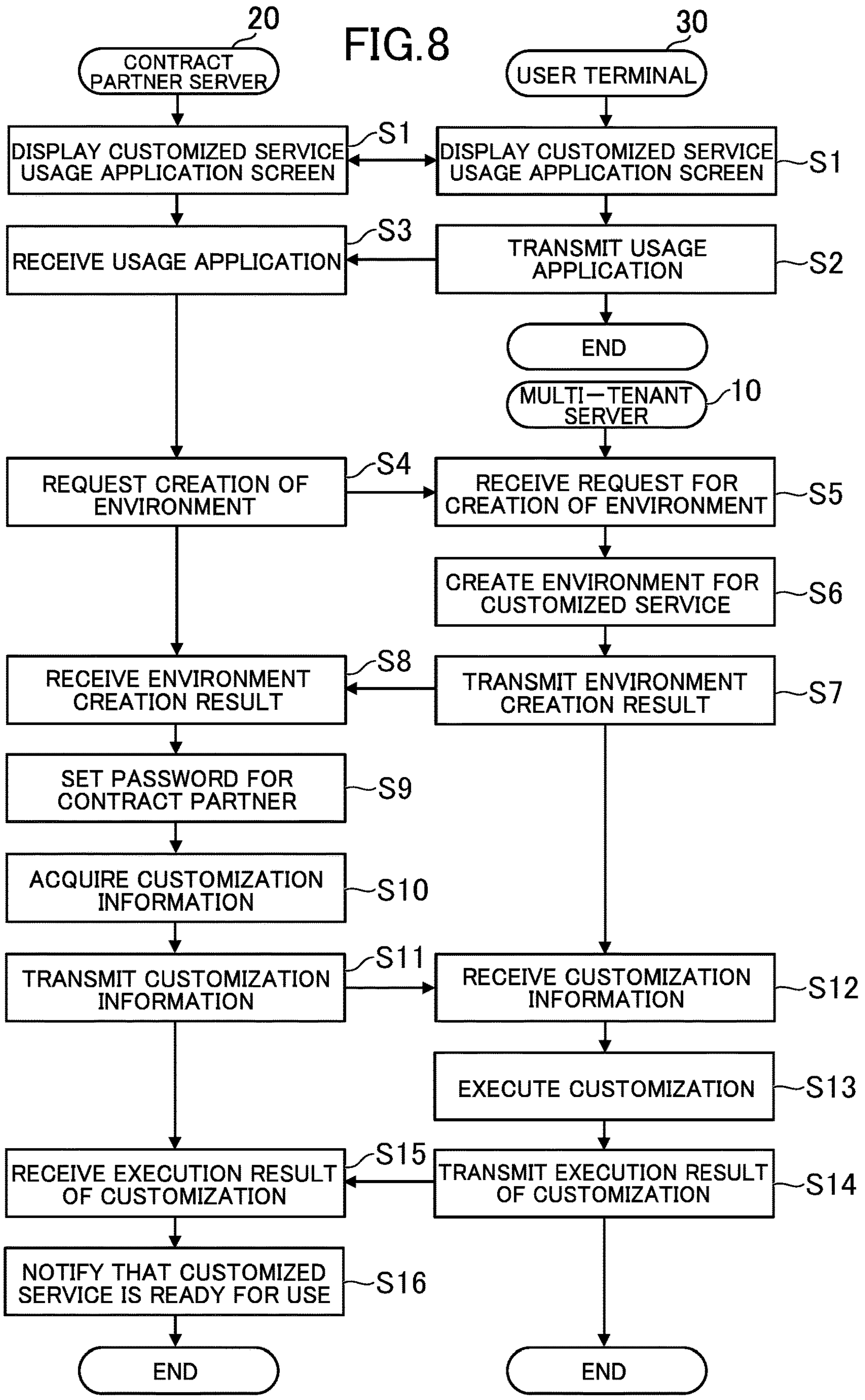
FIG. 8 is a flow chart for illustrating an example of processing to be executed by the multi-tenant system.

FIG. 8 is a flow chart for illustrating an example of processing to be executed by the multi-tenant system 1. In FIG. 8, of the processing to be executed by the multi-tenant system 1, the processing performed when a usage application for a customized service is performed is mainly illustrated.

As illustrated in FIG. 8, when the user designates a link for the customized service usage application screen SC3, the user terminal 30 executes, together with the contract partner server 20, processing for displaying the customized service usage application screen SC3 (Step S1). The user terminal 30 receives input of the items required for the usage application on the customized service usage application screen SC3, and transmits the usage application to the contract partner server (Step S2). The usage application includes the content of each item input by the user.

When the contract partner server 20 receives the usage application (Step S3), the contract partner server 20 requests the multi-tenant server 10 to create an environment for the customized service (Step S4). In Step S4, the contract partner server 20 requests the same environment creation API as that used to create the environment for the original service to create the environment for the customized service. The data format transmitted to the environment creation API is the same as that used when the environment is created for the original service. It should be noted that the request includes identification information that can identify that the service is a customized service.

When the multi-tenant server 10 receives the environment creation request (Step S5), the multi-tenant server 10 creates the environment for the customized service (Step S6). In Step S6, the multi-tenant server 10 generates layout information so as to have a layout specific to the customized service. The multi-tenant server 10 may issue a subdomain based on the same issuing method as that for the original service, but here, the subdomain is issued so as to be specific to the customized service. The multi-tenant server 10 updates the service database DB.

The multi-tenant server 10 transmits the environment creation result to the contract partner server 20 (Step S7). In Step S7, polling is executed between the multi-tenant server 10 and the contract partner server 20 to check the status of the contract partner server 20. When the multi-tenant server 10 detects that the contract partner server 20 side has become ready, the multi-tenant server 10 transmits, to the contract partner server 20, a URL for issuance of the password for the contract partner. The user ID of the contract partner is randomly generated.

When the contract partner server 20 receives the environment creation result (Step S8), the contract partner server 20 sets the password for the contract partner (Step S9). The processing step of Step S9 is automatically executed. The user ID and password of the contract partner are recorded in the contract partner server 20. Thereafter, the contract partner server 20 can log in to the multi-tenant server 10 by using the user ID and password at any timing.

The contract partner server 20 acquires customization information based on an acquisition method determined in advance (Step S10). In Step S10, the layout information for the customized service is recorded in the contract partner server 20. The contract partner server 20 generates the customization information by reading out the layout information for the customized service. The contract partner server 20 logs in to the multi-tenant server 10 with the password set in Step S9, and transmits the customization information to the multi-tenant server 10 (Step S11).

When the multi-tenant server 10 receives the customization information (Step S12), the multi-tenant server 10 executes customization of the customized service based on the received customization information (Step S13). The multi-tenant server transmits the execution result of the customization to the contract partner server 20 (Step S14). When the contract partner server 20 receives the execution result of the customization (Step S15), the contract partner server 20 notifies the user terminal 30 that the customized service is ready for use (Step S16), and ends the processing. Thereafter, processing for using the customized service is executed between the user terminal 30 and the multi-tenant server 10. For example, when the user logs in to the customized service with his or her own user ID and password, the multi-tenant server 10 displays the customized service portal screen SC4 on the display unit 35.

The multi-tenant system 1 of the at least one embodiment executes customization based on the customization information received from the contract partner system 2. The multi-tenant system 1 provides the customized service to the user who has performed the usage application on the contract partner system 2. As a result, instead of the vendor receiving a request from the contract partner and manually executing customization each time a usage application by a user is received, the customization flow from the usage application can be automated, thus reducing the workload of the vendor. Moreover, a staff member of the contract partner is not required to access the multi-tenant server 10 managed by the vendor to execute customization, and thus the workload of the contract partner can be reduced. In addition, through automation of the customization flow, it is possible to prevent human error in performing settings.

Further, the multi-tenant system 1 utilizes the same customization API as that of the original service to execute customization. This eliminates the requirement to prepare an API dedicated to the customized service, effectively reducing the workload of the vendor. For example, even when some kind of modification is required for the customized service, the existing customization API used in the original service can be utilized, and hence the modification workload can be reduced.

Further, the multi-tenant system 1 creates the environment for the customized service when the usage application is received. As a result, on the vendor side, the creation of the environment for the customized service and the acquisition of the customization information can be executed as separate processes, eliminating the time and effort required to manage the customization information on the vendor side. For example, even when the content of the customization is changed by the contract partner, it is not required to reflect the change in the vendor-side multi-tenant server 10, and hence the management burden on the vendor side can be reduced.

Further, the multi-tenant system 1 acquires the customization information from the contract partner system 2 based on a customization API different from the environment creation API. As a result, by separating the environment creation API for creating the rough environment of the customized service and the customization API for executing more detailed customization, the creation and the customization of the environment can be executed by the optimum API.

Further, the multi-tenant system 1 authenticates the contract partner system 2 based on the authentication information issued when the user has performed the usage application. The multi-tenant system 1 acquires the customization information from the contract partner system 2 when authentication is successful. As a result, customization can be executed after having authenticated the validity of the contract partner, thereby increasing security.

Further, the service in the at least one embodiment is a task support service for supporting tasks. Customization is customization specific to a task relating to a contract partner service that the contract partner independently provides. As a result, the workload of the vendor providing the task support service can be reduced.

5. Modification Examples

The present disclosure is not limited to the example of the at least one embodiment described above, and can be modified suitably without departing from the spirit of the present disclosure.

5-1. Modification Example 1

For example, in the at least one embodiment, a case in which the customization information is stored in advance in the data storage unit 200 has been described. However, the customization information may be dynamically generated when the user performs the usage application for a customized service. In the contract partner system 2 in Modification Example 1, the customization information is generated based on the application content designated by the user in the usage application. For example, a layout is designated at the time of performing the usage application. The contract partner server 20 generates customization information corresponding to the layout designated by the user.

The acquisition module 105 in Modification Example 1 acquires, from the contract partner system 2, the customization information generated based on the application content. The execution module 106 executes customization corresponding to the application content. The method of generating the customization information is different from that in the at least one embodiment, but the flow of the processing of executing customization based on the customization information is the same as described in the at least one embodiment. In addition, when customization other than customization of the layout is to be executed, the content of the other customization may be designated at the time of performing the usage application. For example, when customization of other functions, such as the initial plug-ins, apps, spaces, or threads is to be executed, the user may designate the content of those at the time of performing the usage application.

For example, the customization information may indicate the initial plug-ins, apps, spaces, or threads. The execution module 106 executes customization so that the user-designated plug-ins, apps, spaces, or threads are available from the start. For example, the execution module 106 stores information relating to the user-designated plug-ins, apps, spaces, or threads in the service database DB. The provision module 107 provides, based on this information, a customized service so that the plug-ins, apps, spaces, or threads designated by the user are available from the start.

The multi-tenant system 1 of Modification Example 1 acquires, from the contract partner system 2, the customization information generated based on the application content. The multi-tenant system 1 executes customization corresponding to the application content. As a result, it is possible to execute customization corresponding to the content of the application by the user, thereby increasing user convenience.

5-2. Modification Example 2

For example, when the user is to use a contract partner service independently provided by the contract partner, the contract partner system 2 may generate customization information based on user information on the user in the contract partner service. The contract partner service is a service provided directly by a contract partner. For example, when the contract partner is a company that sells devices such as scanners or multi-function printers, the contract partner provides a document management service linked to its own products as the contract partner service. The contract partner service may also be any other service, such as an online storage service.

In Modification Example 2, it is assumed that the user is customizing the layout of a screen such as a contract partner service portal screen. For example, the user operates the user terminal 30 to log in to the contract partner service, and uses the contract partner service. The layout of the screen displayed in this case is stored in the data storage unit 200. The data storage unit 200 stores information relating to the layout of the contract partner service portal screen. For example, the information includes information such as the screen background or logo of the contract partner service.

For example, the contract partner server 20 generates the customization information based on the information relating to contract partner service stored in the data storage unit 200. For example, the contract partner server 20 generates the customization information for the customized service so as to have the same layout as the layout of the contract partner service portal screen. The acquisition module 105 in Modification Example 2 acquires the customization information generated based on the user information from the contract partner system 2. The execution module 106 executes customization corresponding to the user information. The method of generating the customization information is different from that in the at least one embodiment, but the flow of the processing of executing customization based on the customization information is the same as described in the at least one embodiment.

In addition, in Modification Example 2 as well, like in Modification Example 1, customization other than customization of the layout may be executed. For example, the contract partner server 20 may store information relating to the plug-ins and devices that the user is using in the contract partner service. The contract partner server 20 may generate the customization information so that those plug-ins and devices can also be used in the original service. The execution module 106 of the multi-tenant server 10 may execute the customization of the customized service so that the plug-ins and devices that the user is using in the contract partner service can also be used in the original service. It is assumed that the relationship between the information relating to the contract partner service and the customization content is defined in advance in the data storage unit 100. The execution module 106 executes customization based on this relationship.

The multi-tenant system 1 of Modification Example 2 acquires customization information generated based on user information in the contract partner service from the contract partner system 2. The multi-tenant system 1 executes customization corresponding to the user information in the contract partner service. As a result, it is possible to execute customization corresponding to the contract partner service that the user is using, thereby increasing user convenience.

5-3. Modification Example 3

For example, when a user uses the original service, the execution module 106 may execute customization based on the customization information and user information on the user in the original service. In Modification Example 3, a case in which the user cancels the original service and starts using a customized service is described, but the user may start using the customized service without canceling the original service. It is assumed that the information relating to the original service being used by the user is stored in the data storage unit 100.

For example, the execution module 106 refers to the data storage unit 100 and acquires the layout information on the original service being used by the user. The execution module 106 executes customization so as to have the same layout as in the acquired layout information. The customization information obtained from the contract partner system 2 also shows some sort of layout, but pieces of the layout which are missing from the customization information may be supplemented by the layout information stored in the data storage unit 100.

In Modification Example 3 as well, like in Modification Examples 1 and 2, customization other than customization of the layout may be executed. For example, the contract partner server may store information relating to the plug-ins, apps, spaces, or threads that the user is using in the original service. The execution module 106 of the multi-tenant server 10 may execute customization so that the plug-ins, apps, spaces, or threads are still available in the original service. For example, the execution module 106 utilizes the space information, for example, on the original service being used by the user as the space information, for example, of the customized service. The relationship between the information relating to the original service and the customization content is defined in advance in the data storage unit 100. The execution module 106 executes customization based on this relationship.

The multi-tenant system 1 of Modification Example 3 executes customization based on the customization information and the user information on the user in the original service. As a result, it is possible to perform customization corresponding to the original service being used by the user, thereby increasing user convenience.

5-4. Other Modification Examples

For example, Modification Examples 1 to 3 may be combined.

For example, the environment created by the environment creation module 102 can be modified by the execution module 106. In this case, a subdomain may be randomly generated by the environment creation module 102 and modified by the execution module 106 to a subdomain containing the name of the contract partner. The environment created by the environment creation module 102 may be modified by the user after the user starts using the customized service. Conversely, the environment created by environment creation module 102 may be set such that the environment is not modifiable by the execution module 106. Further, the content customized by the execution module 106 may be set such that the content is not modifiable by the user.

For example, the user may be allowed to select whether or not to use the password of the contract partner even after the user starts using the customized service. When the user continues to use the password for the contract partner, the user logs in with the password for the contract partner every time the user performs some sort of change to the settings of the customized service. When the password for the contract partner is not to be used, the user logs in to the customized service with his or her password and changes the settings based on administrator privileges.

For example, each function described above may be implemented by any device in the multi-tenant system 1. For example, the functions described as being implemented by the multi-tenant server 10 may be implemented by another computer included in the multi-tenant system 1. In this case, for example, each function may be shared by a plurality of computers.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A multi-tenant system, comprising at least one processor configured to:
- acquire, from a contract partner system of a contract partner contracted with a vendor of a multi-tenant service, customization information relating to customization specific to the contract partner;
- automatically execute the customization based on the customization information;
- automatically provide a customized service, which is the multi-tenant service on which the customization has been executed, to a user who has performed a predetermined usage application;
- wherein the customization comprises adjusting a layout information of the customized service; and
- execute the customization by utilizing a customization API which is the same as a customization API of an original service, which is the multi-tenant service originally provided by the vendor.

2. The multi-tenant system according to claim 1,
- wherein in the contract partner system, the customization information is generated based on application content designated by the user in the predetermined usage application, and
- wherein the at least one processor is configured to:
  - acquire the customization information generated based on the application content from the contract partner system; and
  - execute the customization corresponding to the application content.

3. The multi-tenant system according to claim 1,
- wherein the user uses a contract partner service independently provided by the contract partner,
- wherein in the contract partner system, the customization information is generated based on user information on the user in the contract partner service, and
- wherein the at least one processor is configured to:
  - acquire the customization information generated based on the user information from the contract partner system; and
  - execute the customization corresponding to the user information.

4. The multi-tenant system according to claim 1,
- wherein the user uses an original service, which is the multi-tenant service originally provided by the vendor, and
- wherein the at least one processor is configured to execute the customization based on the customization information and user information on the user in the original service.

5. A multi-tenant system, comprising at least one processor configured to:

acquire, from a contract partner system of a contract partner contracted with a vendor of a multi-tenant service, customization information relating to customization specific to the contract partner;

automatically execute the customization based on the customization information;

automatically provide a customized service, which is the multi-tenant service on which the customization has been executed, to a user who has performed a predetermined usage application;

create an environment for the customized service when the predetermined usage application is received;

wherein the customization comprises adjusting a layout information of the customized service; and acquire the customization information from the contract partner system based on a customization API different from an environment creation API for creating the environment.

6. The multi-tenant system according to claim 1, wherein the at least one processor is configured to:

issue predetermined authentication information when the user has performed the predetermined usage application;

execute authentication relating to the contract partner system based on the predetermined authentication information; and acquire, when the authentication is successful, the customization information from the contract partner system.

7. The multi-tenant system according to claim 1, wherein the multi-tenant service is a task support service for supporting a task, and wherein the customization is customization specific to a task relating to a contract partner service independently provided by the contract partner.

8. A service provision method, comprising:

acquiring, from a contract partner system of a contract partner contracted with a vendor of a multi-tenant service, customization information relating to customization specific to the contract partner;

automatically executing the customization based on the customization information;

automatically providing a customized service, which is the multi-tenant service on which the customization has been executed, to a user who has performed a predetermined usage application;

wherein the customization comprises adjusting a layout information of the customized service; and executing the customization by utilizing a customization API which is the same as a customization API of an original service, which is the multi-tenant service originally provided by the vendor.

9. The multi-tenant system according to claim 1, wherein a contract partner server sends a request to the multi-tenant server to create an environment for a customized service;

wherein a multi-tenant server creates the environment for the customized service;

wherein the multi-tenant server transmits the environment for the customized service to the contract partner server;

wherein the contract partner server transmits customization information to the multi-tenant server;

wherein the multi-tenant server customizes the environment for the customized service and transmits a result of the customization to the contract partner server;

and wherein the contract partner server notifies the user that the customized service is ready to use.

10. The multi-tenant system according to claim 1, wherein the layout information is information relating to a layout of a plurality of screens to be provided in the customized service.

11. The multi-tenant system according to claim 1, wherein the contract partner system is a third party system with respect to a multi-tenant server.

* * * * *